US008075175B2

(12) United States Patent
Eble et al.

(10) Patent No.: US 8,075,175 B2
(45) Date of Patent: Dec. 13, 2011

(54) METHOD FOR MELTING FROZEN, WATER-CONTAINING PRODUCTS IN A MIXER

(75) Inventors: Axel Eble, Köln (DE); Joachim Ritter, Leverkusen (DE); Dieter Schmidt, Leverkusen (DE)

(73) Assignee: Grifols Therapeutics Inc., Research Triangle Park, NC (US)

( * ) Notice: Subject to any disclaimer, the term of this patent is extended or adjusted under 35 U.S.C. 154(b) by 655 days.

(21) Appl. No.: 10/579,401

(22) PCT Filed: Nov. 6, 2004

(86) PCT No.: PCT/EP2004/012589
§ 371 (c)(1),
(2), (4) Date: Feb. 1, 2007

(87) PCT Pub. No.: WO2005/049188
PCT Pub. Date: Jun. 2, 2005

(65) Prior Publication Data
US 2007/0280039 A1 Dec. 6, 2007

(30) Foreign Application Priority Data
Nov. 19, 2003 (DE) .................. 103 54 109

(51) Int. Cl.
*B01F 15/06* (2006.01)
(52) U.S. Cl. ...................... 366/145; 366/147
(58) Field of Classification Search .............. 366/310, 366/137, 144–149, 53–59, 92–95, 219–240, 366/7; 126/343.5 R; 426/524; 604/416
See application file for complete search history.

(56) References Cited

U.S. PATENT DOCUMENTS

| | | | | |
|---|---|---|---|---|
| 557,163 A * | 3/1896 | Springfels | ............ | 126/343.5 R |
| 607,228 A * | 7/1898 | Dyer | ............ | 366/310 |
| 642,314 A * | 1/1900 | Finigan | ............ | 366/144 |
| 1,735,393 A * | 11/1929 | Hiller | ............ | 241/66 |
| 1,826,598 A * | 10/1931 | Wakefield et al. | ............ | 366/145 |
| 2,004,582 A * | 6/1935 | Muffly | ............ | 366/146 |
| 2,006,876 A * | 7/1935 | Sutter | ............ | 366/145 |
| 2,429,909 A * | 10/1947 | Dudley | ............ | 426/388 |
| 2,478,893 A * | 8/1949 | Brant | ............ | 241/65 |
| 2,588,308 A * | 3/1952 | Tressler | ............ | 426/564 |
| 2,617,273 A * | 11/1952 | Findlay | ............ | 62/545 |
| 2,752,971 A * | 7/1956 | Earls | ............ | 220/4.03 |
| 2,845,929 A * | 8/1958 | Strumia | ............ | 604/113 |
| 2,863,776 A * | 12/1958 | Lisher | ............ | 426/599 |
| 2,924,952 A * | 2/1960 | Swenson et al. | ............ | 62/304 |
| 3,020,025 A * | 2/1962 | O'Mara F | ............ | 165/87 |
| 3,154,663 A * | 10/1964 | Halvorsen | ............ | 219/628 |
| 3,182,699 A * | 5/1965 | Binon | ............ | 99/476 |
| 3,293,049 A * | 12/1966 | Bonuchi et al. | ............ | 426/524 |
| 3,297,061 A * | 1/1967 | Nimee | ............ | 141/9 |
| 3,362,178 A * | 1/1968 | Cottle et al. | ............ | 62/541 |
| 3,402,053 A * | 9/1968 | Longe et al. | ............ | 426/506 |
| 3,516,398 A * | 6/1970 | Hirahara | ............ | 126/343.5 R |
| 3,632,353 A * | 1/1972 | Reimus et al. | ............ | 426/385 |
| 3,689,284 A * | 9/1972 | Nash et al. | ............ | 426/272 |
| 3,765,481 A * | 10/1973 | Root | ............ | 165/92 |
| 3,846,570 A * | 11/1974 | Vetter et al. | ............ | 426/399 |
| 3,941,356 A * | 3/1976 | Mason | ............ | 366/149 |
| 3,952,534 A * | 4/1976 | Jacobs | ............ | 62/136 |
| 3,987,211 A * | 10/1976 | Dunn et al. | ............ | 426/551 |
| 4,039,024 A * | 8/1977 | List | ............ | 165/92 |
| 4,039,168 A * | 8/1977 | Caris et al. | ............ | 366/79 |
| 4,056,260 A * | 11/1977 | David | ............ | 366/144 |
| 4,167,587 A * | 9/1979 | Danforth | ............ | 426/250 |
| 4,171,164 A * | 10/1979 | Groves et al. | ............ | 366/152.1 |
| 4,286,884 A * | 9/1981 | Retrum | ............ | 366/149 |
| 4,351,851 A * | 9/1982 | Riese | ............ | 426/524 |
| 4,464,401 A * | 8/1984 | Kissam | ............ | 426/238 |
| 4,473,739 A * | 9/1984 | Scheiwe et al. | ............ | 392/470 |
| 4,486,389 A * | 12/1984 | Darnell et al. | ............ | 422/307 |
| 4,504,498 A * | 3/1985 | Kissam | ............ | 426/238 |
| 4,638,048 A * | 1/1987 | Foster | ............ | 530/380 |
| 4,652,712 A * | 3/1987 | Zeipel | ............ | 219/753 |
| 4,680,944 A * | 7/1987 | Menzel | ............ | 62/342 |
| 4,714,813 A | 12/1987 | Trenchard | | |
| 4,738,862 A * | 4/1988 | Bee | ............ | 426/565 |
| 4,846,054 A * | 7/1989 | Mange et al. | ............ | 99/495 |
| 4,855,555 A * | 8/1989 | Adams et al. | ............ | 219/753 |
| 4,906,486 A * | 3/1990 | Young | ............ | 426/518 |
| 4,994,294 A * | 2/1991 | Gould | ............ | 426/519 |
| 5,106,643 A * | 4/1992 | Laufer | ............ | 426/565 |
| 5,243,833 A * | 9/1993 | Coelho et al. | ............ | 62/376 |
| 5,264,234 A * | 11/1993 | Windhab et al. | ............ | 426/519 |
| 5,321,126 A * | 6/1994 | van Dommelen et al. | .... | 530/382 |
| 5,360,622 A * | 11/1994 | Yokoyama | ............ | 426/549 |
| 5,362,509 A * | 11/1994 | Martens | ............ | 426/524 |
| 5,403,611 A * | 4/1995 | Tomita et al. | ............ | 426/565 |
| 5,484,614 A * | 1/1996 | Clem | ............ | 426/231 |
| 5,520,885 A * | 5/1996 | Coelho et al. | ............ | 422/101 |
| 5,759,604 A * | 6/1998 | Bottlinger et al. | ............ | 426/433 |
| 5,779,974 A * | 7/1998 | Kuzyk | ............ | 422/44 |
| 5,797,270 A * | 8/1998 | Halterman et al. | ............ | 62/64 |
| 5,939,023 A * | 8/1999 | Coelho et al. | ............ | 422/101 |

(Continued)

FOREIGN PATENT DOCUMENTS
EP 207899 A2 * 1/1987
(Continued)

*Primary Examiner* — Charles E Cooley
(74) *Attorney, Agent, or Firm* — Womble Carlyle Sandridge & Rice, LLP

(57) ABSTRACT

Method for thawing frozen water-containing products by heating and stirring in a horizontal mixer.

6 Claims, No Drawings

U.S. PATENT DOCUMENTS

| | | | | |
|---|---|---|---|---|
| 5,958,481 | A * | 9/1999 | Hodges | 426/100 |
| 6,007,773 | A * | 12/1999 | Kuzyk | 422/44 |
| 6,060,099 | A * | 5/2000 | Ito | 426/243 |
| 6,110,518 | A * | 8/2000 | Cooper et al. | 426/385 |
| RE36,897 | E * | 10/2000 | Murray et al. | 426/11 |
| 6,176,090 | B1 * | 1/2001 | Ufema | 62/68 |
| 6,182,452 | B1 * | 2/2001 | Wright et al. | 62/1 |
| 6,190,718 | B1 * | 2/2001 | Eek et al. | 426/524 |
| 6,242,037 | B1 * | 6/2001 | Vincent | 426/590 |
| 6,513,578 | B2 * | 2/2003 | Frank | 165/63 |
| 6,565,904 | B2 * | 5/2003 | Roth | 426/319 |
| 6,679,314 | B2 * | 1/2004 | Frank | 165/63 |
| 6,730,341 | B2 * | 5/2004 | Ludwig | 426/233 |
| 6,748,164 | B1 * | 6/2004 | Kuzyk | 392/443 |
| 6,817,749 | B2 * | 11/2004 | Saunders et al. | 366/76.7 |
| 6,844,018 | B1 * | 1/2005 | Roth | 426/332 |
| 7,147,884 | B2 * | 12/2006 | Jones et al. | 426/565 |
| 7,306,820 | B2 * | 12/2007 | Hoashi et al. | 426/643 |
| 7,524,520 | B2 * | 4/2009 | Ludwig | 426/233 |
| 7,550,696 | B2 * | 6/2009 | Tanaka et al. | 219/697 |
| 7,790,437 | B2 * | 9/2010 | Poo et al. | 435/284.1 |
| 2002/0033021 | A1 * | 3/2002 | Frank | 62/68 |
| 2002/0037345 | A1 | 3/2002 | Hoashi | |
| 2003/0068414 | A1 * | 4/2003 | Ito | 426/237 |
| 2003/0082069 | A1 * | 5/2003 | Kuzyk | 422/1 |
| 2003/0108655 | A1 | 6/2003 | Ishifune | |
| 2003/0214874 | A1 * | 11/2003 | Hlavinka et al. | 366/197 |
| 2004/0233781 | A1 * | 11/2004 | Dickson, Jr. et al. | 366/318 |
| 2004/0237564 | A1 * | 12/2004 | Zevlakis | 62/340 |
| 2006/0034991 | A1 * | 2/2006 | Nielsen | 426/524 |
| 2006/0081653 | A1 * | 4/2006 | Boland et al. | 222/243 |
| 2006/0147595 | A1 * | 7/2006 | Nielsen | 426/524 |
| 2007/0127901 | A1 * | 6/2007 | Kuzyk | 392/446 |
| 2007/0195642 | A1 * | 8/2007 | Singh | 366/211 |
| 2007/0280039 | A1 * | 12/2007 | Eble et al. | 366/145 |

FOREIGN PATENT DOCUMENTS

| | | | |
|---|---|---|---|
| EP | 574327 | A1 * | 12/1993 |
| JP | 56148234 | A * | 11/1981 |
| JP | 61149051 | A * | 7/1986 |
| JP | 61149052 | A * | 7/1986 |
| JP | 61283338 | | 12/1986 |
| JP | 62134040 | A * | 6/1987 |
| JP | 63230032 | A * | 9/1988 |
| JP | 63263067 | A * | 10/1988 |
| JP | 02211825 | A * | 8/1990 |
| JP | 04349848 | A * | 12/1992 |
| JP | 08126465 | A * | 5/1996 |
| JP | 08294358 | A * | 11/1996 |
| JP | 2003230355 | | 8/2003 |
| SU | 704643 | | 12/1979 |
| WO | WO 03032740 | A1 * | 4/2003 |
| WO | WO 2004066742 | A1 * | 8/2004 |

* cited by examiner

METHOD FOR MELTING FROZEN, WATER-CONTAINING PRODUCTS IN A MIXER

This is a 371 of PCT/EP2004/012589 filed 6 Nov. 2004 (international filing date).

The invention relates to a method of melting frozen, water-containing products, in particular protein-containing products, using a mixer having horizontal internals.

The method is suitable for the gentle melting of water-based ice which contains, in particular, both mechanically and thermally sensitive substances.

BACKGROUND OF THE INVENTION

Especially biological products which can only be produced in small quantities have to be temporarily stored before further processing. This is usually carried out by means of freezing in order to maintain the quality of the product during storage. The controlled thawing of the products serves not least to even out the product properties which, particularly in the case of biological products, can vary greatly from batch to batch. To achieve a small range of fluctuation of the product properties, it is frequently necessary for several hundred to a few thousand batches to be thawed together and mixed with one another.

This is frequently carried out in vertical stirred vessels with jacket heating, because in this way no seal is touched by the product when the stirrer is operated from above. The ice pieces are taken from the storage containers and introduced into the stirred vessel. Breaking up the ice pieces is often not advisable for hygienic reasons. It is frequently also the case that no additives are required or are even permitted, so that the melting process in the stirred vessel takes place initially without a liquid phase. The ice pieces are set into rotary motion by the stirrer and slide along the heated wall of the vessel. The molten material collects the bottom of the vessel. Owing to the size of the ice pieces relative to the internal diameter of the stirred vessel (the ratio of edge length to diameter can even exceed $1/10$), the installation of baffles is not advisable. There is therefore a risk of the ice pieces jamming and leading to mechanical failure of the stirrer.

For this reason and to intensify heat transfer via the wall, stirrers which travel around the wall, for example helical stirrers, are usually employed. Owing to the low friction between water ice and the wall of the vessel due to formation of a water film and the movement of the stirrer used around the wall, the ice pieces are not mixed with one another. In extreme cases, it is even possible for ice pieces which have previously been partially thawed on the external surfaces but are still deep frozen on the inside to freeze together and form a coherent mass which rotates together with the stirrer without any relative motion. The ice pieces which touch the wall melt at the wall until an air gap having a width of a few millimetres has been formed. In this mode of operation, there is hardly any formation of fresh contact areas, so that the thawing process takes longer. During this process, the thawed material is subjected to a high thermal stress for a prolonged time, which can have an undesirable effect on the product properties.

In all cases, the ice pieces float on the surface because of their lower density compared to the molten material. The previously mentioned low wall friction leads to the impetus necessary for axial transport not being able to be introduced. A division into a molten fraction in the lower region and still solid ice pieces rotating together with the stirrer in the upper region is the result. Heat exchange between these two regions is hindered by the lack of axial transport of the ice pieces, which has the consequence that the molten product is subjected to a high thermal stress over a long period of time.

It was an object of the invention to accelerate the melting process of mechanically and thermally unstable substances in aqueous solutions and to avoid mechanical and thermal stress as far as possible. Particular attention was to be paid to ensuring that local overheating due to separation of solid and liquid phases is nevertheless avoided at a low specific power input as high space-time yield by means of low stirrer speeds.

This object is achieved by a method which prevents separation of the two phases by use of a horizontal mixer in which the stirrer elements do not rotate about a vertical axis but make vertical mixing possible.

SUMMARY OF THE INVENTION

The invention provides a method of thawing frozen, water-containing products, in particular protein-containing products, by introducing the frozen product into a horizontal mixer, heating the mixer and at the same time mixing the contents of the mixer intensively, with any floating frozen product being continually submerged in the liquefied phase and mixed with this.

Preference is given to a method in which the mixing and heating is continued until the product has been melted completely.

Preference is also given to a method in which frozen product is continuously introduced into the horizontal mixer, mixing and heating are carried out continuously and a thawed product is taken off in the same amount so that a steady state is established. Such a continuous method has the advantage that control of the temperature is simplified and the residence time is shortened and the thermal stress on the product is thus reduced.

DETAILED DESCRIPTION

For the purposes of the invention, a horizontal mixer is a dynamic mixing apparatus which has a stirrer (movable internals) and whose axis or axes (in the case of a plurality of stirrer shafts) of rotation are arranged essentially horizontally. This will be taken to encompass an apparatus whose axis of rotation of the stirrer shafts is at an angle of at least 45° to the vertical.

Preference is given to a method in which a disc mixer, ploughshare mixer or Becker mixer is used as horizontal mixer.

Further preference is given to a method in which mixing elements having internal heating are used as horizontal mixer.

Particular preference is given to using a horizontal mixer which has wiping elements travelling around the wall, in particular a mixer having a self-cleaning factor of at least 80%, in the method.

Further preference is given to a method in which protein-containing solutions and suspensions from natural biological sources or from biological processes, particularly preferably blood plasma, are used as water-containing product.

In the method thawing blood plasma or blood plasma products, the temperature of the mixture is maintained at less than 10° C. above the melting point, preferably less than 5° C. above the melting point, during the entire process.

The method can be carried out either batchwise or continuously.

In continuous operation, completely melted product is taken off from the mixer and further frozen product is introduced batchwise.

The continuous method reduces the residence time of the products in the melting zone and is particularly useful for the treatment of particularly sensitive products.

In the method of the invention, floating ice pieces are conveyed upwards from the surface of the melt and are randomly conveyed by gravity to other places in the mixer. Secondly, they are pushed downwards into the molten phase which is in the process of warming. The forced vertical relative motion of the frozen products significantly improves the heat transfer between the frozen phase and the liquid phase. This also leads to higher temperature gradients at the wall and thus to an overall shorter melting time compared to the methods known from the prior art.

EXAMPLES

Example 1

Water ice in cylindrical form having volumes of about 20 ml was introduced into a cylindrical vessel having a diameter of 200 mm and jacket heating. The degree of fill was varied in the range from 40 to 100%. Here, a degree of fill of 100% corresponded to the maximum charge of water ice in the frozen state. The vessel was firstly operated vertically, then horizontally. The speed of rotation of the mixer was maintained at a constant 30 $min^{-1}$ in all experiments. The jacket heating was set to a water temperature of 20 or 30° C. The thawing process was observed by means of a temperature sensor in the cylindrical vessel. In vertical operation, there was insufficient vertical exchange between liquid and ice, resulting in long thawing times. The relevant thawing time was determined by attainment of a particular temperature, measured by the temperature sensor in the cylindrical vessel. In the case of horizontal operation, good mixing between previously thawed water and still frozen ice was achieved by the vertical movement of the mixing blades. The heating area available was always greater in vertical operation than in horizontal operation. At a degree of fill of 40%, the measured thawing times were able to be halved. At the maximum degree of fill, the thawing times were reduced by a factor of <0.8. The significant reduction in the thawing time is a consequence of the better mixing in horizontal operation, because the internal heat transfer coefficient at a constant temperature difference is increased as a result and the reduction the heat transfer area can be more than compensated for.

Example 2

In a second experiment, frozen human blood plasma in pieces of about 50 ml was introduced into the same experimental vessel and thawed under otherwise identical conditions. The temperature curves at degrees of fill of 70% displayed the same significant effect of the halving of the thawing times. Apart from the temperature curves, the activity of a protein (factor VIII) which precipitates during the thawing process was analyzed. As a result of the shorter thawing times and the lower thermal stress due to the more homogeneous temperature field in the cylindrical vessel, activity increases of generally 20% or more were obtained in horizontal operation compared to vertical operation.

The invention claimed is:

1. Method of thawing pieces of ice which contain blood plasma or blood plasma products and water, which comprises introducing said pieces of ice into a horizontal mixer, said horizontal mixer comprising at least one stirrer whose axis of rotation is arranged horizontally, heating the horizontal mixer and at the same time mixing the contents of the mixer to maintain the temperature of the contents of the mixer at a temperature which is less than 10° C. above the melting point of said pieces of ice, whereby said pieces of ice are melted to form a liquid phase and during such melting, floating pieces of said pieces of ice which have not yet been melted are continually submerged in the liquefied phase and mixed with it.

2. Method according to claim 1, wherein said horizontal mixer is a disc mixer or ploughshare mixer.

3. Method according to claim 1, wherein said horizontal mixer has mixing elements which have internal heating.

4. Method according to claim 1, wherein said horizontal mixer has wiping elements traveling around the wall thereof.

5. Method according to claim 1, wherein the horizontal mixer is operated continuously.

6. The Method according to claim 1, wherein said temperature is maintained at less than 5° C. above the melting point of the ice.

* * * * *